March 21, 1933.  H. H. PHILLIPS  1,902,663
TRELLIS, ARBOR, AND THE LIKE
Filed May 23, 1931
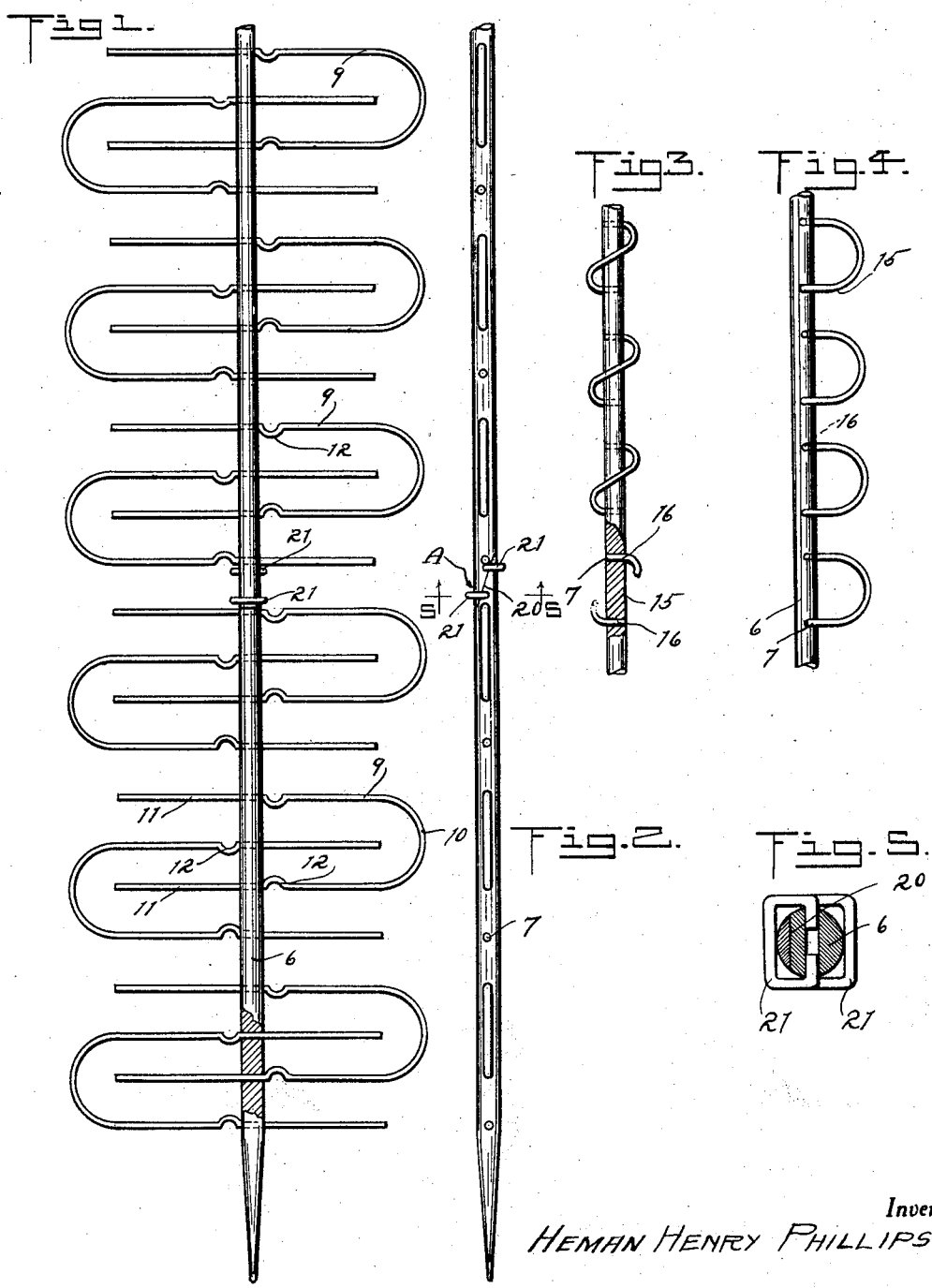
Inventor
HEMAN HENRY PHILLIPS
By *Clarence A O'Brien*
Attorney Patented Mar. 21, 1933

1,902,663

UNITED STATES PATENT OFFICE

HEMAN HENRY PHILLIPS, OF CHARLEMONT, MASSACHUSETTS

TRELLIS, ARBOR, AND THE LIKE

Application filed May 23, 1931. Serial No. 539,598.

The present invention relates to new and useful improvements in trellises, arbors and the like.

It is one of the objects of the present invention to provide a device of the aforementioned character which may be used in training flowers, vegetables and the like of various types.

It is a further object of the invention to provide a plurality of interchangeable arms or the like which are employed for use with plants of different types.

A further object of the invention resides in a new and novel construction whereby a plurality of such devices may be removably secured together in end to end relation to thereby provide a trellis or an arbor of any desired type.

With the above and other objects in view, reference will be had to the accompanying drawing, wherein:

Figure 1 is a view in front elevation of a trellis constructed in accordance with that form of the present invention, Figure 2 is a view in end elevation thereof, Figure 3 is a detail sectional view showing one form of arm carried by the main body portion of the trellis, Figure 4 is a view in elevation taken at right angles to Figure 3, and Figure 5 is a detail sectional view taken on the line 5—5 of Figure 2.

Referring more particularly to the drawing, the device comprises a main body portion 6 of elongated form. This body portion 6 may be formed of metal, wood or other suitable material, and is in the general form of a stake. The body portion 6 is provided with a plurality of equi-distantly spaced openings or passages 7 and these openings or passages are adapted to receive arms or the like which extend latterly or at right angles to the longitudinal axis of the main body portion.

In that form of the invention illustrated in Figures 1 and 2, the lateral arms consist of wire U-shaped members 9 which are bent to provide curved portions 10 and spaced legs 11. In each of the legs 11 there is a bent portion 12 which provides a stop for engagement with the main body member 6 to limit the movement of the arms relative thereto and to determine their position with respect to said main body member. The arms are placed as illustrated in Figure 1 in such a manner that the curved portions 10 thereof will alternate with the free ends of the legs 11, and it is to be understood that when the members are placed in the openings in the main body member 6, it will be necessary to bend them slightly in such a manner to produce tension which will be sufficient to retain the arms in position in the openings without accidental displacement, and yet permit of their ready removal therefrom.

In Figures 3 and 4 there is shown a slightly modified form and in this form of the invention, the arms consist of U-shaped members 15 having offset ends 16 arranged in such a manner that these offset ends enter the openings 7 in the main body portion from opposite sides thereof. The members are given a slight lateral twist and this twist produces enough tension so that when the members are spread to permit of the insertion of the free ends thereof in the openings 7, the members will be placed under sufficient tension to retain the same in place against accidental displacement and yet at the same time provide for their ready removal from the main body member 6.

Means is provided whereby a plurality of the body members 6 may be secured together in end to end relation, and for this purpose each body member is provided with a tapered end 20 and each body member is provided with a loop or eye member 21 which is adapted to engage the other member when the two bevel faces 20 are positioned together at A in Figure 2. When the members have been so arranged the weight of the upper member operating upon the inclined face of the lower member, causes a wedging or binding action between each member and the loop of the other member thus insuring secure attachment of the two members together.

From the foregoing, it will be apparent that the present invention provides a new and novel form of trellis, arbor or the like which is simple in construction, which is relatively cheap to manufacture, and which may be used with various varieties of plants merely by changing the type of arms to suit the plant desired.

While the invention has been herein illustrated in a preferred form, it is to be understood that the invention is not to be limited to the construction herein shown, and that it may be practiced in other forms without departing from the spirit thereof.

Having thus described the invention, what is claimed as new and what it is desired to secure by Letters Patent of the United States, is:

A device of the character described comprising a main body member of elongated form and having a plurality of aligned openings passing therethrough, and a plurality of resilient U-shaped members having their leg portions removably insertable thru said openings, and said members being retained in place by their own resiliency, the leg portions of each of said U-shaped members being formed intermediate their ends with opposed offset portions defining stops for engaging said main body member.

In testimony whereof I affix my signature.

HEMAN HENRY PHILLIPS.